(12) United States Patent
Cheng et al.

(10) Patent No.: US 11,760,292 B2
(45) Date of Patent: Sep. 19, 2023

(54) SLEEPING BEDSHEET CRASH PROTECTION SYSTEM FOR LIE-FLAT SLEEPING PASSENGER

(71) Applicant: GM Global Technology Operations LLC, Detroit, MI (US)

(72) Inventors: Yi-Pen Cheng, Troy, MI (US); Chin-hsu Lin, Troy, MI (US); Louis D. Thole, Grosse Pointe Park, MI (US); Wonhee Michael Kim, Royal Oak, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 46 days.

(21) Appl. No.: 17/511,720

(22) Filed: Oct. 27, 2021

(65) Prior Publication Data

US 2023/0126971 A1    Apr. 27, 2023

(51) Int. Cl.
| | |
|---|---|
| *B60R 21/08* | (2006.01) |
| *A47G 9/02* | (2006.01) |
| *B60R 21/0132* | (2006.01) |
| *B60R 21/21* | (2011.01) |
| *B60R 21/00* | (2006.01) |
| *B60R 21/01* | (2006.01) |
| *B60R 21/06* | (2006.01) |
| *B60R 21/013* | (2006.01) |

(52) U.S. Cl.
CPC .............. *B60R 21/08* (2013.01); *A47G 9/0238* (2013.01); *B60R 21/0132* (2013.01); *B60R 21/21* (2013.01); *B60R 2021/0004* (2013.01); *B60R 2021/0009* (2013.01); *B60R 2021/0034* (2013.01); *B60R 2021/01034* (2013.01); *B60R 2021/01252* (2013.01); *B60R 2021/01315* (2013.01); *B60R 2021/065* (2013.01)

(58) Field of Classification Search
CPC ...... B60R 21/08; B60R 21/0132; B60R 21/21; A47G 9/0238; B60R 2021/0004; B60R 2021/0009; B60R 2021/0034; B60R 2021/01034; B60R 2021/01252; B60R 2021/01315; B60R 2021/065; B60R 22/14
See application file for complete search history.

(56) References Cited

U.S. PATENT DOCUMENTS 4,311,339 A * 1/1982 Heath .................. B60N 2/2839
5,690,355 A * 11/1997 Kleinberg ................ B60P 3/38
                                                     280/730.1
(Continued)

FOREIGN PATENT DOCUMENTS

| CN | 109383395 A | * | 2/2019 | .................... B60R 5/04 |
| CN | 112406769 A | * | 2/2021 | |

(Continued)

OTHER PUBLICATIONS

Wohllebe T, 'Machine Translation of DE 102019201306 Obtained Sep. 14, 2022', Feb. 1, 2019, Entire Document. (Year: 2019).*

*Primary Examiner* — James M Dolak
*Assistant Examiner* — Scott F. Underwood
(74) *Attorney, Agent, or Firm* — Vivacqua Crane PLLC

(57) ABSTRACT

A sleeping occupant crash protection system includes an occupant sleeping compartment positioned within an autonomous vehicle. A substantially flat platform of the occupant sleeping compartment supports an occupant reclining in a horizontal sleep position. An elastic bedsheet is positioned in direct contact with an upper surface of the platform positioned between the occupant and the platform. A sensing system is in communication with the occupant sleeping compartment and triggers deployment of a bedsheet displacement system during a vehicle rapid deceleration event.

18 Claims, 7 Drawing Sheets

(56) References Cited

U.S. PATENT DOCUMENTS

| | | | | |
|---|---|---|---|---|
| 10,029,602 | B1* | 7/2018 | Spickler et al. | B60P 3/39 |
| 11,040,689 | B2* | 6/2021 | Lin et al. | B60R 21/20 |
| 11,225,216 | B1* | 1/2022 | Lin et al. | B60R 21/207 |
| 2006/0138797 | A1* | 6/2006 | Wang et al. | B60N 2/0276 |
| | | | | 296/68.1 |
| 2007/0018442 | A1* | 1/2007 | Kwok | B60R 21/08 |
| | | | | 280/749 |
| 2009/0200818 | A1* | 8/2009 | Giesa et al. | B64D 11/0641 |
| | | | | 24/593.1 |
| 2010/0171348 | A1* | 7/2010 | Rajasingham | B60N 2/2878 |
| | | | | 297/216.1 |
| 2015/0217673 | A1* | 8/2015 | Langhoff | B60R 21/06 |
| | | | | 5/118 |

FOREIGN PATENT DOCUMENTS

| | | | | |
|---|---|---|---|---|
| DE | 102019201306 | A1* | 8/2020 | |
| JP | 2011156934 | A * | 8/2011 | |
| SE | 527806 | C2* | 6/2006 | B60R 21/06 |
| WO | 0216172 | A1* | 2/2002 | B60P 3/38 |
| WO | 2009041864 | A1* | 4/2009 | B60R 21/08 |

* cited by examiner

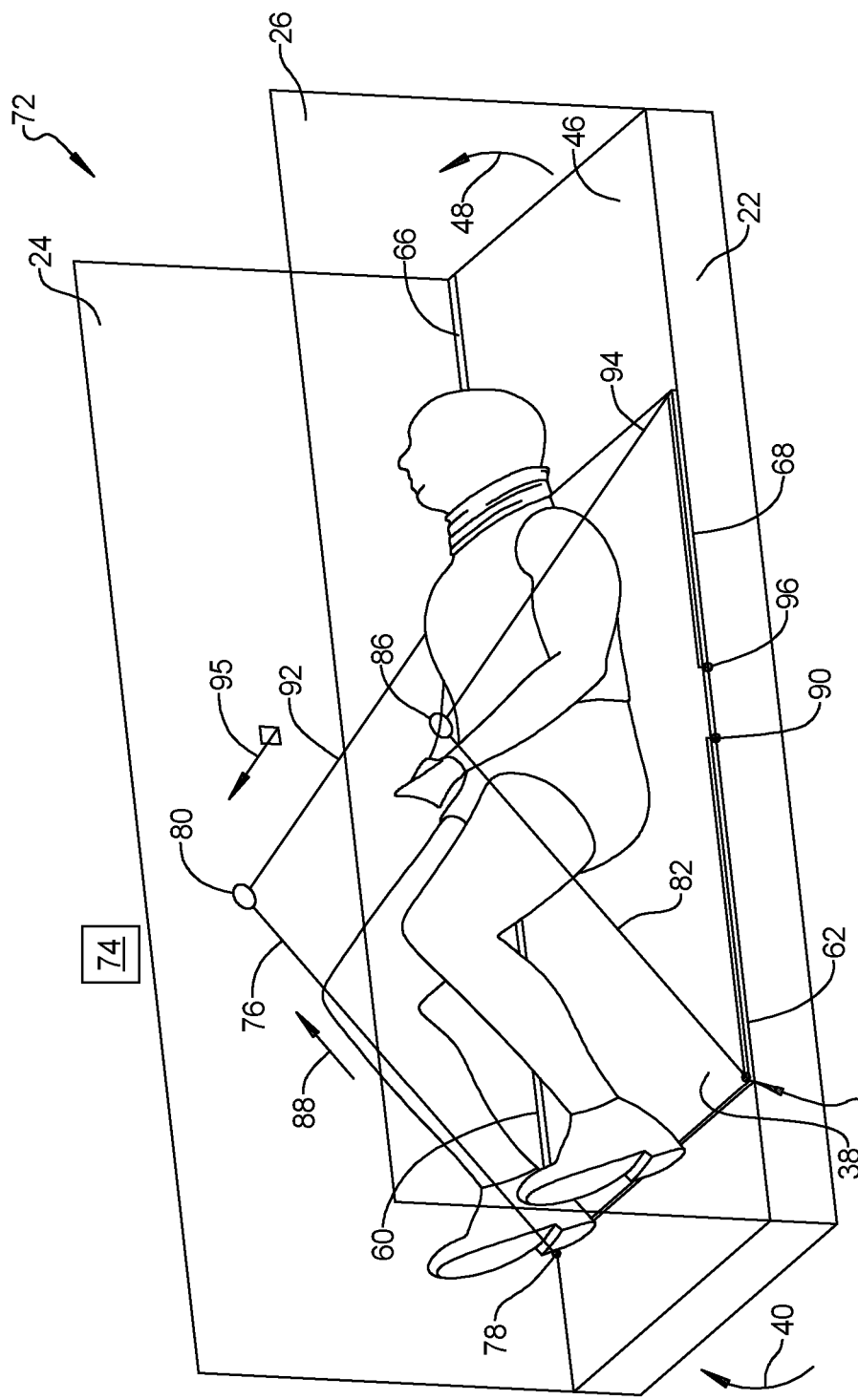

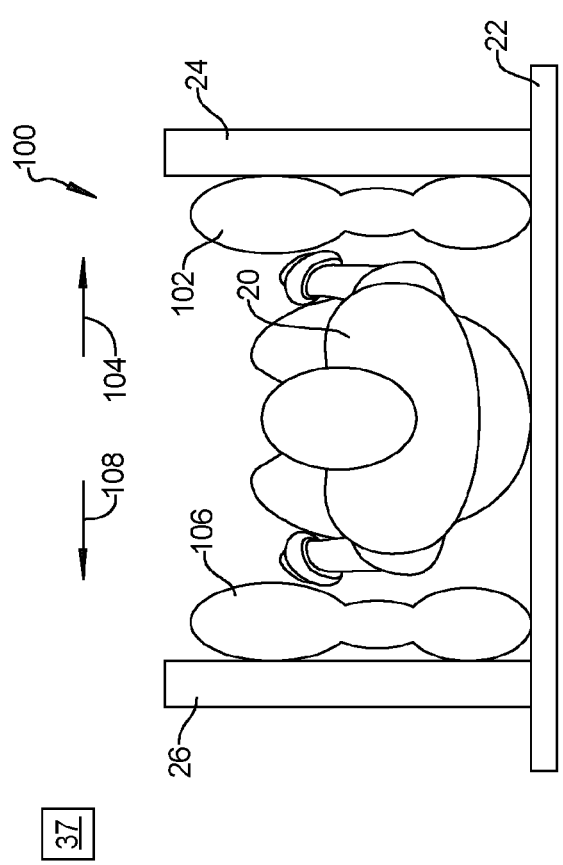
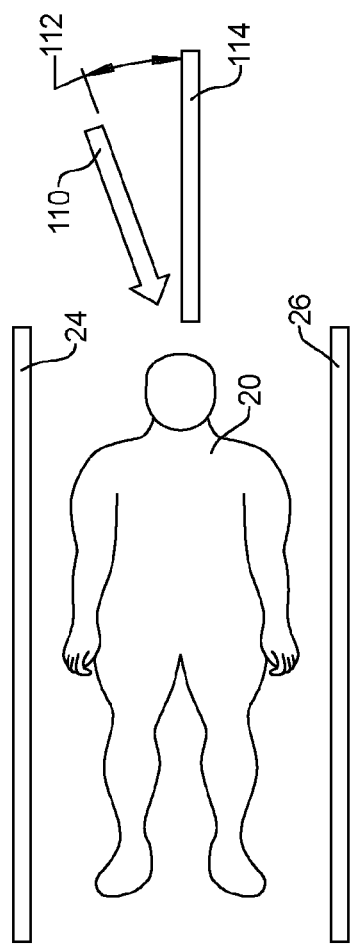

SLEEPING BEDSHEET CRASH PROTECTION SYSTEM FOR LIE-FLAT SLEEPING PASSENGER

INTRODUCTION

The present disclosure relates to methods of protecting vehicle occupants while sleeping during autonomous vehicle travel.

Autonomously operated automobile vehicles offer occupants an opportunity to rest or sleep in a prone or horizontal position during travel to a predetermined destination. Current vehicle seats offer occupant protection using seat belts and air bags, assuming the occupant is restrained locally to the seat during rapid deceleration events such as front and rear vehicle crashes. During periods of occupant sleep or rest with the seat in a fully reclined position, however, seat belts may not be effective to restrain an occupant. In addition, vehicle seats do not completely recline to allow an occupant horizontal sleep position.

Thus, while current automobile vehicle restraint systems achieve their intended purpose, there is a need for a new and improved protective system.

SUMMARY

According to several aspects, a sleeping occupant crash protection system includes an occupant sleeping compartment positioned within an autonomous vehicle. A substantially flat platform of the occupant sleeping compartment supports an occupant reclining in a horizontal sleep position. An elastic bedsheet is positioned in direct contact with an upper surface of the platform positioned between the occupant and the platform. A sensing system is in communication with the occupant sleeping compartment and triggers deployment of a bedsheet displacement system during a vehicle rapid deceleration event.

In another aspect of the present disclosure, the bedsheet includes a first bedsheet portion rotated about a first arc of rotation toward a vehicle rearward facing direction when the vehicle rapid deceleration event defines a vehicle rear impact. A second bedsheet portion is rotated about a second arc of rotation toward a vehicle forward facing direction opposite to the vehicle rearward facing direction when the vehicle rapid deceleration event defines a vehicle front impact.

In another aspect of the present disclosure, the bedsheet displacement system includes a first initiation system in communication with the sensing system, the first initiation system including: a first arm laying on the upper surface of the platform in a non-displaced position. A second arm lays on the upper surface of the platform in a non-displaced position. The first bedsheet portion is connected to free ends of the first arm and to the second arm.

In another aspect of the present disclosure, a first actuation device defines a rapid displacement first motor, wherein the first arm and the second arm are connected to the first actuation device.

In another aspect of the present disclosure, when the vehicle rapid deceleration event defines a front vehicle impact an acceleration of the occupant in the vehicle forward facing direction is induced, and a signal from the sensing system directs rotation of a first bedsheet portion of the elastic bedsheet approximately 90 degrees upward about an arc of rotation away from a contact position with the upper surface of the platform.

In another aspect of the present disclosure, femurs/legs of the occupant including occupant hips are rotated together with the first bedsheet portion in the vehicle rearward facing direction, and contact and elastically deflect the first bedsheet portion and are restrained by the first bedsheet portion.

In another aspect of the present disclosure, the bedsheet displacement system includes a second initiation system in communication with the sensing system. The second initiation system includes: a third arm laying on the upper surface of the platform in a non-displaced position; and a fourth arm laying on the upper surface of the platform in a non-displaced position. The second bedsheet portion is connected to free ends of the third arm and to the fourth arm.

In another aspect of the present disclosure, a second actuation device defines a rapid displacement second motor. The third arm and the fourth arm are connected to the second actuation device. When the vehicle rapid deceleration event defines a rear vehicle impact an acceleration of the occupant in the vehicle rearward facing direction is induced, and a signal from the sensing system directs rotation of a second bedsheet portion of the elastic bedsheet approximately 90 degrees upward about an arc of rotation away from a contact position with the upper surface of the platform and toward the forward facing direction. A head and a torso of the occupant including occupant hips rotate in the vehicle forward facing direction, contact and elastically deflect the second bedsheet portion and are restrained by the second bedsheet portion.

In another aspect of the present disclosure, opposed vertically oriented side walls of the occupant sleeping compartment including a first wall and an opposed second wall oriented parallel to the first wall.

In another aspect of the present disclosure, a first airbag mounted to the first wall and a second airbag mounted to the second wall, the first airbag and the second airbag actuated by a signal from the sensing system during the vehicle rapid deceleration event.

According to several aspects, a sleeping occupant crash protection system includes an occupant sleeping compartment positioned within an autonomous vehicle. A substantially flat platform of the occupant sleeping compartment supporting an occupant initially reclining in a horizontal sleep position. An elastic bedsheet is positioned in direct contact with an upper surface of the platform and positioned between the occupant and the platform, the elastic bedsheet having a first portion rotated in a vehicle rearward facing direction during a first vehicle rapid deceleration event, and a second portion oppositely rotated in a vehicle forward facing direction during a second vehicle rapid deceleration event. A sensing system is in communication with the occupant sleeping compartment and triggers rotation of at least one of the first bedsheet portion during the first vehicle rapid deceleration event and the second bedsheet portion during the second vehicle rapid deceleration event.

In another aspect of the present disclosure, a frangible seam normally connects the first bedsheet portion to the second bedsheet portion. An overlapped portion defining a folded portion of the bedsheet connected to the first bedsheet portion and the second bedsheet portion by the frangible seam.

In another aspect of the present disclosure, when one of the first vehicle rapid deceleration event and the second vehicle rapid deceleration event has less than a predetermined impact force acting on the bedsheet by the occupant, the frangible seam is retained.

In another aspect of the present disclosure, when one of the first vehicle rapid deceleration event and the second vehicle rapid deceleration event has an occupant acceleration impact force greater than a predetermined impact force from the occupant acting on the bedsheet, the frangible seam releases to absorb a portion of the occupant acceleration impact force and the bedsheet lengthens by a length of the folded portion providing additional energy absorption by the bedsheet.

In another aspect of the present disclosure, a first actuation device defines a rapid displacement first motor wherein the first portion of the bedsheet is connected to the first actuation device and is displaced by operation of the first actuation device. A second actuation device defines a rapid displacement second motor wherein the second portion of the bedsheet is connected to the second actuation device and is displaced by operation of the second actuation device.

In another aspect of the present disclosure, a pulley device is positioned above the platform and is connected by at least one first cable to the first bedsheet portion and by at least one second cable to the second bedsheet portion. Actuation of the pulley device in a first direction acts to rotate the first bedsheet portion in the vehicle rearward facing direction. Actuation of the pulley device in a second direction acts to rotate the second bedsheet portion in the vehicle forward facing direction.

In another aspect of the present disclosure, when an oblique impact force occurs at an oblique angle with respect to a vehicle longitudinal axis of the autonomous vehicle is within a pre-set angle range - $\theta_1 \sim +\theta_1$, determined by acceleration magnitudes from the sensing system, only the first bedsheet portion and the second bedsheet portion are deployed. When the oblique impact force occurring at the oblique angle is more than $\theta_1$ but less than a second pre-set angle ($\theta_2$), both the first bedsheet portion and the second bedsheet portion are deployed and at least one side airbag connected to the occupant sleeping compartment is deployed. When the oblique impact force occurring at the oblique angle is within $+\theta_2 \sim (180°-\theta_2)$, only the at least one side airbag is deployed.

According to several aspects, a method for protecting sleeping occupants of an autonomous vehicle includes: positioning an occupant sleeping compartment within an autonomous vehicle; supporting an occupant reclining in a horizontal sleep position on a substantially flat platform of the occupant sleeping compartment; positioning an elastic bedsheet in direct contact with an upper surface of the platform and positioned between the occupant and the platform; and placing a sensing system in communication with the occupant sleeping compartment and triggering deployment of a bedsheet displacement system during a vehicle rapid deceleration event.

In another aspect of the present disclosure, the method further includes: rotating a first bedsheet portion of the bedsheet about a first arc of rotation toward a vehicle rearward facing direction when the vehicle rapid deceleration event defines a vehicle rear impact; and rotating a second bedsheet portion of the bedsheet about a second arc of rotation toward a vehicle forward facing direction opposite to the vehicle rearward facing direction when the vehicle rapid deceleration event defines a vehicle front impact.

In another aspect of the present disclosure, the method further includes: sending a first signal from the sensing system to direct rotation of the first bedsheet portion of the elastic bedsheet approximately 90 degrees upward away from a contact position with the upper surface of the platform to mitigate an acceleration of the occupant in the vehicle forward facing direction when the vehicle rapid deceleration event defines a front vehicle impact; and sending a second signal from the sensing system to direct rotation of the second bedsheet portion of the elastic bedsheet approximately 90 degrees upward away from a contact position with the upper surface of the platform to mitigate an acceleration of the occupant in the vehicle rearward facing direction when the vehicle rapid deceleration event defines a rear vehicle impact.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a top left perspective view of the system of FIG. 1 presenting a second actuation aspect;

FIG. 9 is an end elevational view of another aspect of the present disclosure;

FIG. 10 is a top plan view of the system of FIG. 1;

DETAILED DESCRIPTION

The following description is merely exemplary in nature and is not intended to limit the present disclosure, application, or uses.

Figure 1:
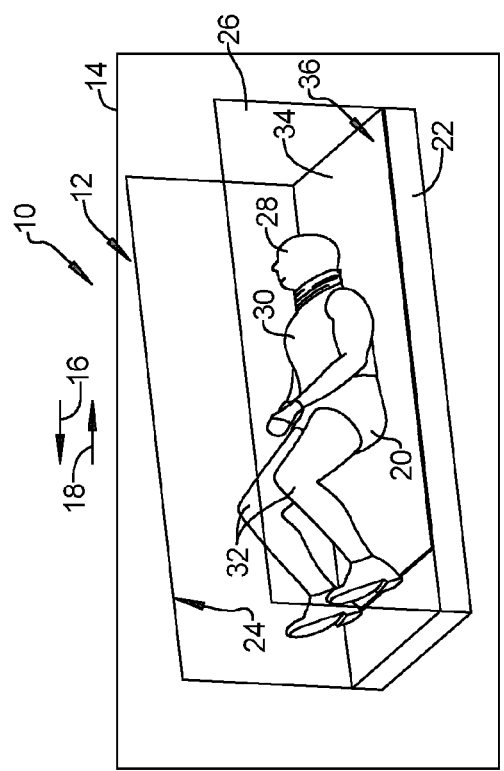
FIG. 1 is a top left perspective view of an elastic sleeping bedsheet crash protection system according to an exemplary aspect.

Referring to FIG. 1, an elastic sleeping bedsheet crash protection system 10 includes an occupant sleeping compartment 12 positioned within an autonomous vehicle 14. The occupant sleeping compartment 12 is oriented parallel with a vehicle forward facing direction 16 and an opposite vehicle rearward facing direction 18. An occupant 20 may recline in a horizontal sleep position supported on a substantially flat platform 22 which is oriented parallel to the vehicle forward facing direction 16 and the opposite vehicle rearward facing direction 18. According to several aspects, the platform 22 may define a polymeric cushion covered for example with leather, vinyl, or a similar cover material, a foam mattress or the like. The occupant sleeping compartment 12 includes opposed vertically oriented side walls including a first wall 24 and an opposed second wall 26 oriented parallel to the first wall 24.

In a normal horizontal sleeping position, a head 28, a torso 30 and femurs/legs 32 of the occupant 20 may be in direct contact with an elastic bedsheet 34 which lays on top of the platform 22. According to several aspects the elastic bedsheet 34 is positioned in direct contact with an upper surface 36 of the platform 22. According to several aspects the occupant 20 may lie with the head 28 directed in the vehicle rearward facing direction 18 as shown, or oppositely may lie with the head 28 directed in the vehicle forward facing direction 16.

Figure 5:
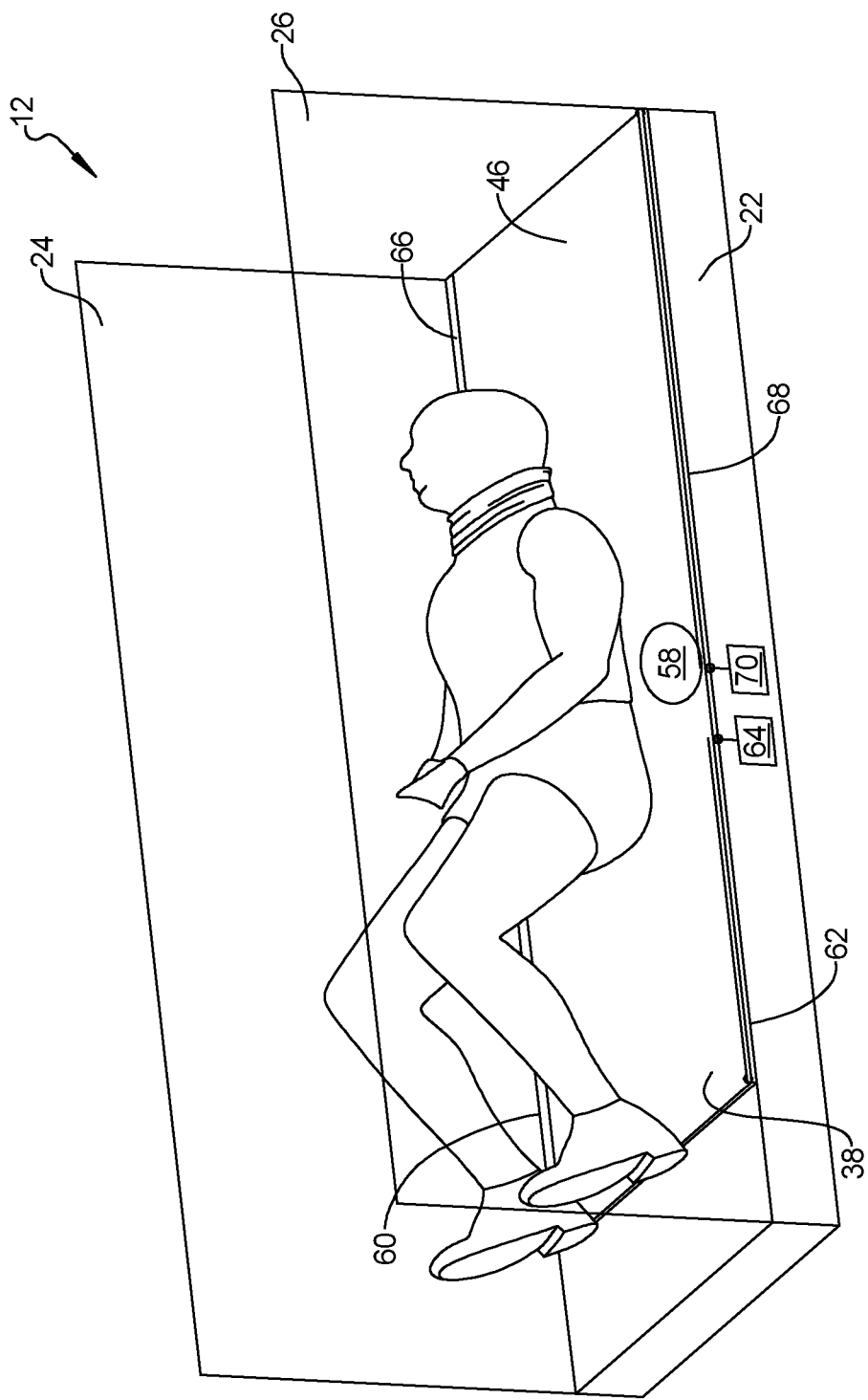
FIG. 5 is a top left perspective view of the system of FIG. 1 presenting a first actuation aspect.

Referring to FIG. 2 and again to FIG. 1, the occupant sleeping compartment 12 is in communication with a sensing system 37 which may for example define an accelerometer. During a vehicle rapid deceleration event such as a sensed front collision or a sensed rear collision including a vehicle impact event, the sensing system 37 generates a signal which is sent at least to the occupant sleeping compartment 12 which initiates operation of a bedsheet displacement system described in greater detail in reference to FIG. 5.

Figure 2:
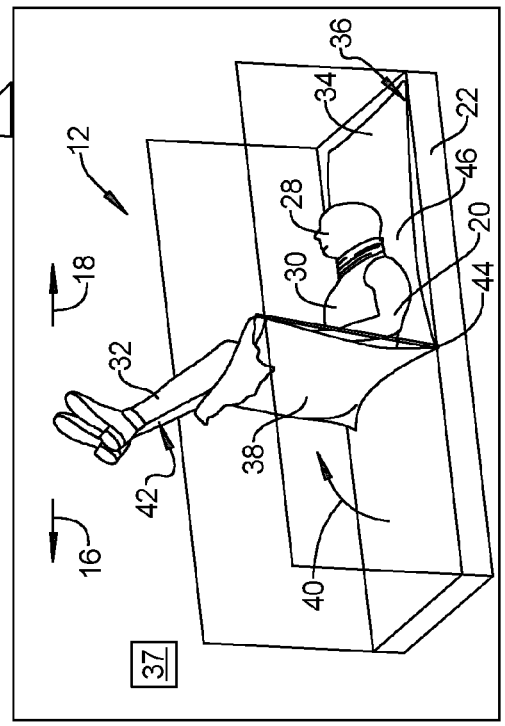
FIG. 2 is a top left perspective view of the system of FIG. 1 in a first actuation position.

With continuing reference to FIG. 2, in a first exemplary system operation a vehicle rapid deceleration event defining a front vehicle impact occurs which induces an acceleration of the occupant 20 in the vehicle forward facing direction 16. A signal from the sensing system 37 directs rotation of a first bedsheet portion 38 of the elastic bedsheet 34 approximately 90 degrees upward about an arc of rotation 40 away from a contact position with the upper surface 36 of the platform 22. According to several aspects the femurs/legs 32 of the occupant 20 including the hips are rotated together with the first bedsheet portion 38 in the vehicle rearward facing direction 18. During rotation of the first bedsheet portion 38 a bottom surface 42 of the femurs/legs 32 remain in direct contact with the first bedsheet portion 38 as the first bedsheet portion 38 rotates about an axis of rotation 44 oriented substantially perpendicular to the vehicle forward facing direction 16 and the opposite vehicle rearward facing direction 18. At this time the head 28 and the torso 30 of the occupant 20 remain in contact or in sliding contact with a second bedsheet portion 46 which remains in contact with the upper surface 36 of the platform 22. In this configuration the occupant 20 is restricted by the first bedsheet portion 38 from displacing in the vehicle forward facing direction 16 and the first bedsheet portion 38 elastically deflects to absorb impact energy of the occupant 20.

Referring to FIG. 3 and again to FIGS. 1 and 2, in an exemplary second system operation a vehicle rapid deceleration event defining a rear vehicle impact occurs which induces an acceleration of the occupant 20 in the vehicle rearward facing direction 18. A signal from the sensing system 37 directs rotation of the second bedsheet portion 46 of the elastic bedsheet 34 approximately 90 degrees upward about an arc of rotation 48 away from a contact position with the upper surface 36 of the platform 22. According to several aspects the head 28 and the torso 30 of the occupant 20 together with the hips are rotated together with the second bedsheet portion 46 in the vehicle forward facing direction 16. During rotation of the second bedsheet portion 46 a bottom surface 50 of the head 28 and the torso 30 remain in direct contact with the second bedsheet portion 46 as the second bedsheet portion 46 rotates about an axis of rotation 52 oriented substantially perpendicular to the vehicle forward facing direction 16 and the opposite vehicle rearward facing direction 18. At this time the femurs/legs 32 of the occupant 20 may remain in contact with or in sliding contact with the first bedsheet portion 38 which remains in contact with the upper surface 36 of the platform 22. In this configuration the occupant 20 is restricted by the second bedsheet portion 46 from displacing in the vehicle rearward facing direction 18 by contact with the second bedsheet portion 46 due to the acceleration forces of the rear vehicle impact. The second bedsheet portion 46 elastically deflects to absorb impact energy of the occupant 20.

Figure 3:
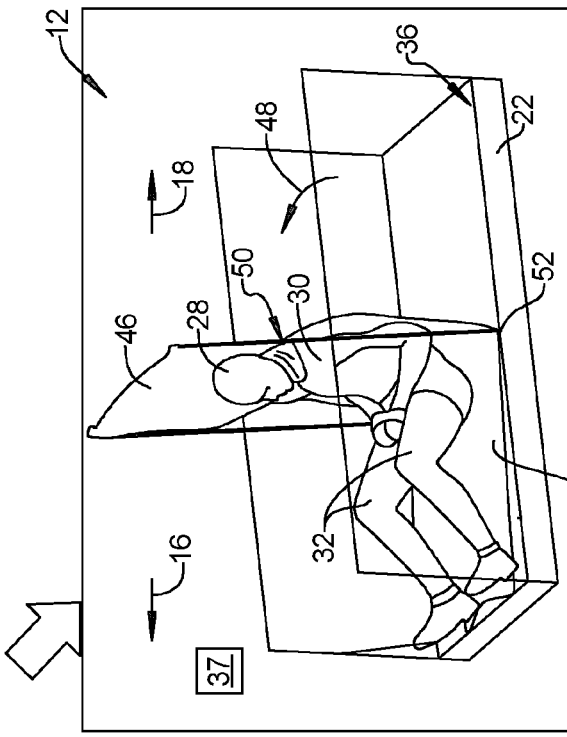
FIG. 3 is a top left perspective view of the system of FIG. 1 in a second actuation position.
Figure 4:
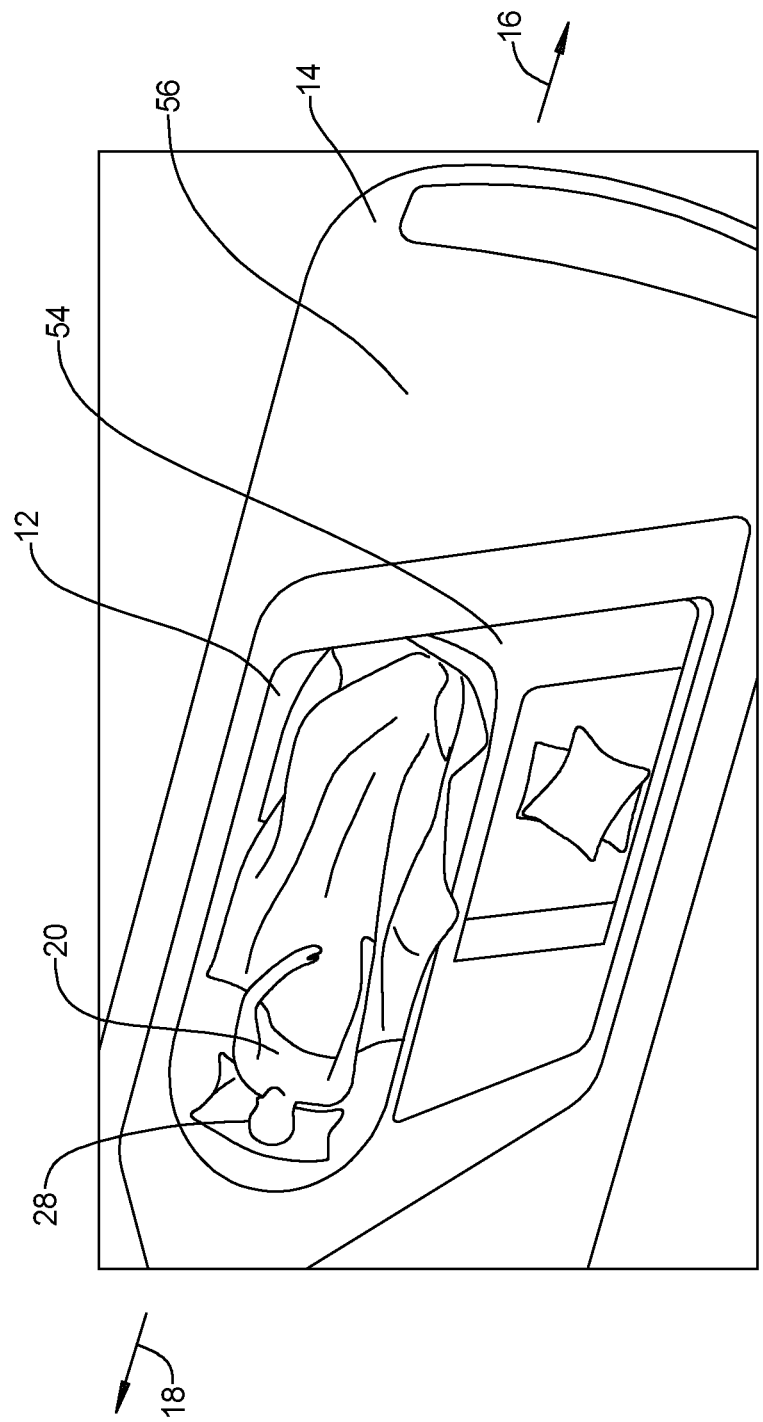
FIG. 4 is a top plan view of the system of FIG. 1.

Referring to FIG. 4 and again to FIGS. 1 through 3, in an exemplary configuration a single one of the occupant sleeping compartments 12 is shown positioned on a driver's or left-hand side of the autonomous vehicle 14. The occupant sleeping compartment 12 is located in a passenger compartment 54 rearward of a driver's compartment 56. In the arrangement shown, the head 28 of the occupant 20 is positioned at a vehicle rear-facing end and toward the vehicle rearward facing direction 18 as the autonomous vehicle moves in the vehicle forward facing direction 16. According to further aspects the single one of the occupant sleeping compartments 12 may be located beside or on a passenger side of the passenger compartment 54, or an additional second one of the occupant sleeping compartments 12 (not shown) may be located beside or on the passenger side the passenger compartment 54.

Referring to FIG. 5 and again to FIGS. 1 through 3, according to several embodiments the occupant sleeping compartment 12 may be operated using a bedsheet displacement system defining a first initiation system 58, which is in communication with the sensing system 37. The first initiation system 58 includes a first arm 60 positioned proximate to and parallel with the first wall 24 laying on the upper surface 36 of the platform 22 in a non-displaced position, and a second arm 62 positioned proximate to and parallel with the second wall 26 also laying on the upper surface 36 of the platform 22 in a non-displaced position. The first bedsheet portion 38 is connected to free ends of the first arm 60 and to the second arm 62. The first arm 60 and the second arm 62 are rotated by operation of the first initiation system 58 which may for example include a rapid displacement motor when the first initiation system 58 receives the signal from the sensing system 37. The platform 22 also includes a first energy absorption device 64, which absorbs energy imparted by the occupant as the occupant displaces for example as shown in reference to FIG. 7. The first arm 60 and the second arm 62 are connected to the first energy absorption device 64 and are configured to slide relative to the platform 22, allowing the first energy absorption device 64 to absorb a portion of the energy imparted by the occupant 20 on the first bedsheet portion 38. If a front collision acceleration signal is generated by the sensing system 37 indicative of an imminent or actual vehicle front collision, the front collision acceleration signal is sent to the first initiation system 58 which initiates rotation of the first arm 60 and the second arm 62 about the arc of rotation 40 described in reference to FIG. 2, thereby rotating the first bedsheet portion 38 as described in reference to FIG. 2.

Figure 8:
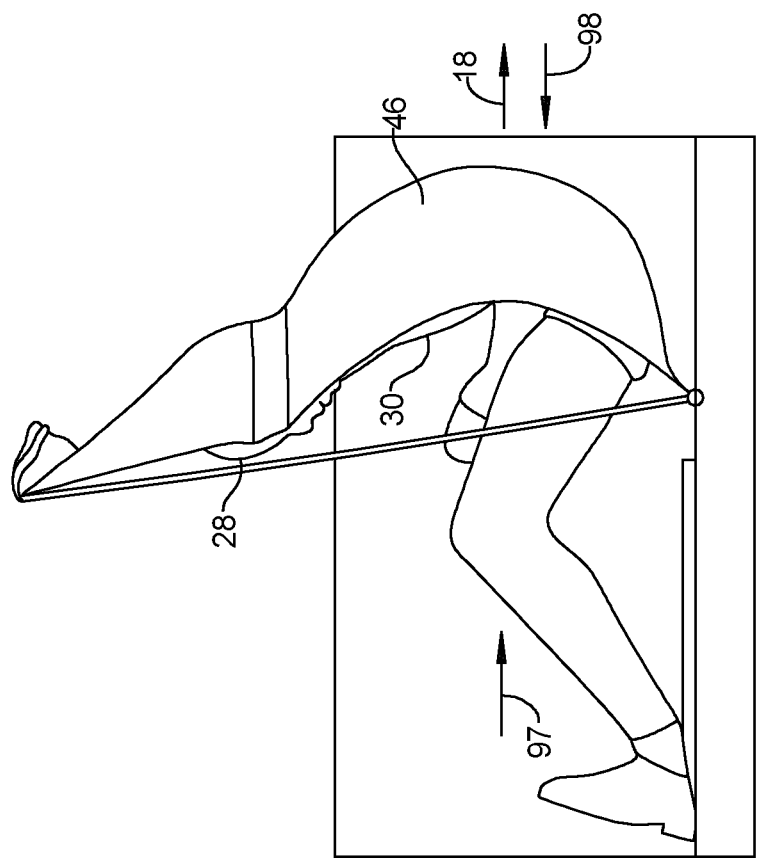
FIG. 8 is a side elevational view of the second actuation position shown in FIG. 3.

The first initiation system 58 further includes a third arm 66 positioned proximate to and parallel with the first wall 24 laying on the upper surface 36 of the platform 22 in a non-displaced position, and a fourth arm 68 positioned proximate to and parallel with the second wall 26 also laying on the upper surface 36 of the platform 22 in a non-displaced position. The second bedsheet portion 46 is connected to free ends of the third arm 66 and to the fourth arm 68. The third arm 66 and the fourth arm 68 are rotated by operation of the first initiation system 58 which may for example include a rapid displacement motor when the first initiation system 58 receives the signal from the sensing system 37. The platform 22 also includes a second energy absorption device 70, which absorbs energy imparted by the occupant as the occupant displaces for example as shown in reference to FIG. 8. The third arm 66 and the fourth arm 68 are connected to the second energy absorption device 70 and are configured to slide relative to the platform 22, allowing the second energy absorption device 70 to absorb a portion of the energy imparted by the occupant 20 on the second bedsheet portion 46. If an acceleration signal is generated by the sensing system 37 indicative of an imminent or actual vehicle rear collision, a rear collision acceleration signal is sent to the first initiation system 58 which initiates rotation of the third arm 66 and the fourth arm 68 about the arc of rotation 48 described in reference to FIG. 3, thereby rotating the second bedsheet portion 46 as described in reference to FIG. 3.

Referring to FIG. 6 and again to FIGS. 1 through 5, according to several aspects the elastic sleeping bedsheet crash protection system 10 may further include an occupant sleeping compartment 72 which is modified from the occupant sleeping compartment 12 as follows, having common components identified with the same part numbers. In lieu of the first initiation system 58 being directly connected to and displacing the first arm 60 and the second arm 62, and the first initiation system 58 being directly connected to and displacing the third arm 66 and the fourth arm 68, the occupant sleeping compartment 72 may be operated using a second initiation system 74 which is in communication with the sensing system 37.

The second initiation system 74 includes with the first arm 60 positioned proximate to and parallel with the first wall 24 laying on the upper surface 36 of the platform 22 in a non-displaced position, and the second arm 62 positioned proximate to and parallel with the second wall 26 laying on the upper surface 36 of the platform 22 in a non-displaced position. A first cable 76 is connected to a free end 78 of the first bedsheet portion 38 and to a pulley device 80 raised above the platform 22 and rotatably connected to the first wall 24. A second cable 82 is connected to a free end 84 of the first bedsheet portion 38 and to a second pulley device 86 raised above the platform 22 and rotatably connected to the second wall 26. If a front collision acceleration signal is generated by the sensing system 37 indicative of an imminent or actual vehicle front collision, the acceleration signal is sent to the second initiation system 74 which initiates operation of the first pulley device 80 and the second pulley device 86 which simultaneously retract the first cable 76 and the second cable 82 in a first retraction direction 88 to pull the first bedsheet portion 38 about an axis of rotation 90 in the arc of rotation 40 described in reference to FIG. 2.

The second initiation system 74 also includes the third arm 66 positioned proximate to and parallel with the first wall 24 laying on the upper surface 36 of the platform 22 in a non-displaced position, and the fourth arm 68 positioned proximate to and parallel with the second wall 26 laying on the upper surface 36 of the platform 22 in a non-displaced position. A third cable 92 is connected to the second bedsheet portion 46 and to the pulley device 80 raised above the platform 22 and rotatably connected to the first wall 24. A fourth cable 94 is connected to the second bedsheet portion 46 and to the second pulley device 86 raised above the platform 22 and rotatably connected to the second wall 26. If a rear collision acceleration signal is generated by the sensing system 37 indicative of an imminent or actual vehicle rear collision, the acceleration signal is sent to the second initiation system 74 which initiates operation of the first pulley device 80 and the second pulley device 86 which simultaneously retracts the third cable 92 and the fourth cable 94 in a second retraction direction 95 to pull the second bedsheet portion 46 about an axis of rotation 96 in the arc of rotation 48 described in reference to FIG. 3.

Referring to FIG. 7 and again to FIGS. 2 and 3, during a vehicle front collision the occupant 20 accelerates in the vehicle forward facing direction 16 and the femurs/legs 32 of the occupant 20 contact and elastically extend the first bedsheet portion 38. This elastic extension generates an oppositely directed first rebound force 97 acting to redirect the occupant 20 in the vehicle rearward facing direction 18.

Figure 7:
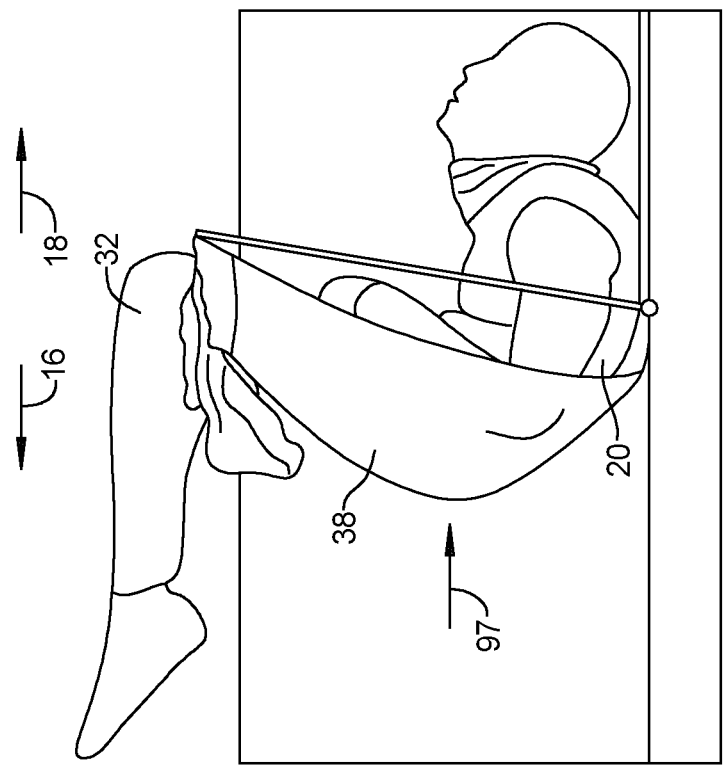
FIG. 7 is a side elevational view of the first actuation position shown in FIG. 2.

Referring to FIG. 8 and again to FIGS. 2, 3 and 7, following the vehicle front collision described in reference to FIG. 7 the first rebound force 97 generated by elastic compression of the first bedsheet portion 38 accelerates the occupant 20 in the vehicle rearward facing direction 18. Simultaneously or within a predetermined time period following displacement of the first bedsheet portion 38, the second bedsheet portion 46 is displaced in the vehicle forward facing direction 16 as described in reference to FIG. 3. The head 28 and the torso 30 of the occupant 20 contact and elastically extend the second bedsheet portion 46, which absorbs the first rebound force 97.

It is noted that a vehicle rear collision actuates the second bedsheet portion 46 and then the first bedsheet portion 38 in an opposite order from the order noted above. The second bedsheet portion 46 thereby generates a second rebound force 98 oppositely directed with respect to the first rebound force 97, which is absorbed by the first bedsheet portion 38.

Referring to FIG. 9 and again to FIGS. 1 through 6, according to several aspects the elastic sleeping bedsheet crash protection system 10 may further include an occupant sleeping compartment 100 which is modified from the occupant sleeping compartment 12 and the occupant sleeping compartment 72 as follows, having common components identified with the same part numbers. The occupant sleeping compartment 100 includes a side airbag (SiAB) system having opposed side airbags which are inflated during a vehicle rapid deceleration event such as an oblique angle collision including a vehicle impact event. During the vehicle rapid deceleration event having an oblique angle component the sensing system 37 generates a signal which is sent at least to the occupant sleeping compartment 100. In response to the signal from the sensing system 37 a first airbag 102 of the SiAB system connected to the first wall 24 inflates which protects the occupant 20 when accelerated in a first outward direction 104. Also in response to the signal from the sensing system 37 a second airbag 106 of the SiAB system connected to the second wall 26 inflates which protects the occupant 20 when accelerated in a second outward direction 108 which is oppositely directed with respect to the first outward direction 104.

Referring to FIG. 10 and again to FIG. 9, for oblique angle impacts to the autonomous vehicle 14, the SiAB system embedded into the first wall 24 and the second wall 26 mitigates the impact force acting on the occupant 20 with the following deployment logic: When an oblique impact force 110 occurring at an oblique impact angle 112 with respect to a vehicle longitudinal axis 114 of the vehicle is within a pre-set angle range - $\theta_1 \sim +\theta_1$, determined by acceleration magnitudes from the accelerometer of the sensing system 37, only the first bedsheet portion 38 or the second bedsheet portion 46 will be deployed. When the oblique impact angle 112 is more than $\theta_1$ but less than a second pre-set angle ($\theta_2$), both the first bedsheet portion 38 and-or the second bedsheet portion 46 will be deployed and the side airbags will be deployed. When the oblique impact angle 112 is within $+\theta_2 \sim (180°-\theta_2)$, only the side airbags will be deployed.

Referring to FIG. 11 and again to FIGS. 1 through 8, according to several aspects the elastic sleeping bedsheet crash protection system 10 may further include a modified bedsheet system 116 incorporating a unitary bedsheet 118 having a first frangible seam 120 normally connecting a first bedsheet portion 122 to a second bedsheet portion 124. A first overlapped portion 126 defines a first folded portion of the material of the unitary bedsheet 118 connected to the first bedsheet portion 122 and the second bedsheet portion 124 by the first frangible seam 120. The modified bedsheet system 116 may further include a second frangible seam 128 normally connecting the second bedsheet portion 124 to a third bedsheet portion 130. A second overlapped portion 132 defines a second folded portion of the material of the unitary bedsheet 118 connecting the second bedsheet portion 124 and the third bedsheet portion 130 by the second frangible seam 128. According to several aspects the first frangible seam 120 may be formed using a thread size, strength and/or diameter which is less than a thread size, strength and/or diameter of the thread used for the second frangible seam 128 to permit different force levels of energy required to break the first frangible seam 120 or the second frangible seam 128. A thread pattern may also be varied between the first frangible seam 120 and the second frangible seam 128 to provide different breaking forces of the two seams.

According to several aspects, during a vehicle impact event of a first predetermined impact force from the occupant 20, the first frangible seam 120 is retained and the second frangible seam 128 is retained, and the unitary bedsheet 118 absorbs the impact force of the occupant 20. The occupant 20 for this first aspect may be for example a child or a young adult of low weight.

During a vehicle impact event having an occupant acceleration second predetermined impact force greater than the first predetermined impact force and less than a third predetermined impact force from the occupant 20 acting on the unitary bedsheet 118, the first frangible seam 120 releases. Due to the additional energy absorption causing release of the frangible seam 120, as well as the additional length added by the first overlapped portion 126 now available, the unitary bedsheet 118 absorbs the second predetermined impact force which is greater than the first predetermined impact force and less than the third predetermined impact force of the occupant 20. The occupant 20 for this second aspect may be for example an adult of medium weight.

During a vehicle impact event having an occupant acceleration third predetermined impact force which is greater than the first predetermined impact force and greater than the second predetermined impact force from the occupant 20 acting on the unitary bedsheet 118, the second frangible seam 128 releases. Due to the additional energy absorption causing release of the second frangible seam 128, as well as the additional length added by the second overlapped portion 132 now available, the unitary bedsheet 118 absorbs an occupant impact force defining the highest or the third predetermined impact force of the occupant 20. The occupant 20 for this third aspect may be for example an adult of high weight.

Figure 11:
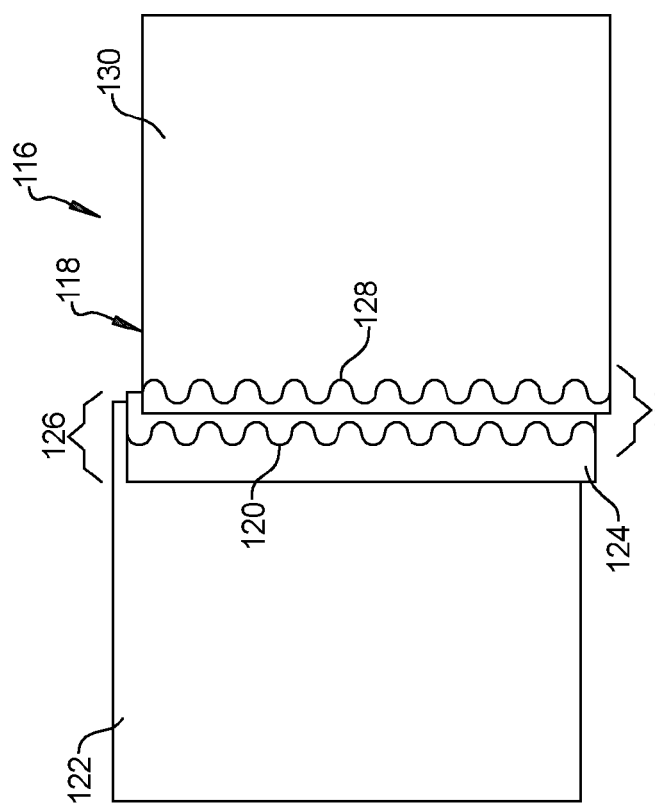
FIG. 11 is a top plan view of of an elastic sleeping bedsheet according to another aspect.
Figure 12:
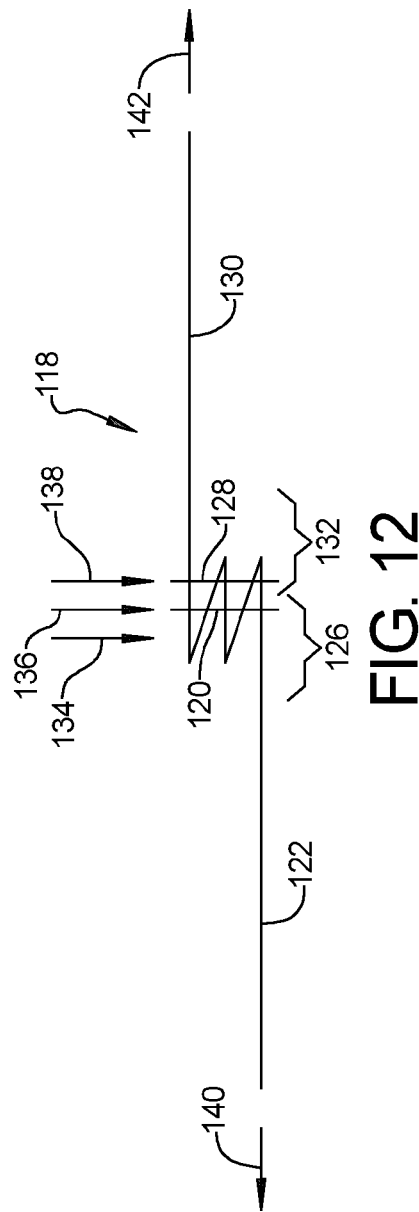
FIG. 12 is a side elevational view of the elastic sleeping bedsheet of FIG. 11.

Referring to FIG. 12 and again to FIG. 11, a first predetermined impact force 134 of the occupant 30 acting against the unitary bedsheet 18 is not sufficient to fracture either the first frangible seam 120 or the second frangible seam 128. A second predetermined impact force 136 of the occupant 30 greater than the first predetermined impact force acting against the unitary bedsheet 18 is sufficient to fracture the first frangible seam 120 but does not fracture the second frangible seam 128. The resulting displacement of the unitary bedsheet 118 in a direction of the second predetermined impact force 136 causes extension of the first bedsheet portion 122 in a direction 140 opposite to an extension of the second bedsheet portion 130 in a direction 142, resulting in fracture of the first frangible seam 120, plus the addition of a length of the first overlapped portion 126.

A third predetermined impact force 136 of the occupant 30 greater than the second predetermined impact force 136 acting against the unitary bedsheet 18 is sufficient to fracture the first frangible seam 120 and the second frangible seam 128. The resulting displacement of the unitary bedsheet 118 in a direction of the third predetermined impact force 138 causes extension of the first bedsheet portion 122 in the direction 140 opposite to the extension of the second bedsheet portion 130 in the direction 142, resulting in fracture of both the first frangible seam 120 and the second frangible seam 128, plus the addition of the length of the first overlapped portion 126 and a length of the second overlapped portion 132.

An elastic sleeping bedsheet crash protection system 10 of the present disclosure provides a pre-crash sensing system 37 that determines a vehicle impact event is imminent and the deployment of a bedsheet protection system is required to restrain a sleeping occupant 20. When the pre-crash sensing system 37 determines the impact direction is "from-feet-to-head", at "x" ms prior to impact, the first bedsheet portion 38 partially under the occupant's lower torso is pushed upward, along with the femur/legs 32, to form an "L-shaped catching net". The subsequent impact force will push the occupant 20 into the "catching" first bedsheet portion 38 along an occupant torso direction. The upper or second bedsheet portion 46 may be raised up later in the impact event to capture the rebounding occupant 20.

Referring to FIGS. 1 through 12, the pre-crash sensing system 37 determines that a crash is imminent and deployment of one or more of the bedsheet portions is required to restrain a sleeping occupant. According to several aspects, when the pre-crash sensing system 37 determines the impact direction is "from-head-to-feet", at "x" ms prior to impact, the second bedsheet portion 46 under the upper torso 30 and the head 28 is pushed upward, along with the upper torso 30 and the head 28, to form an "L-shape catching net". The subsequent impact will push the occupant 20 into the "catching" or second bedsheet portion 46 similar to a rear impact event of a seated passenger. The lower extremity or first bedsheet portion 38 may be raised up later in the impact event to capture the rebounding occupant 20.

An elastic sleeping bedsheet crash protection system 10 of the present disclosure offers several advantages. These include a system which alters a position of a sleeping occupant from a lie-flat to a crash friendly posture prior to an imminent front, rear or oblique impact event. Depending on the direction of vehicle impact, either the upper torso and the head or the femurs/legs are pushed upward into a crash friendly posture prior to vehicle impact. During the subsequent impact event, a bedsheet of the present disclosure having high elasticity functions as a catch net that catches and decelerates the occupant relative to the autonomous vehicle 14. Depending on the impact direction, the elastic sleeping bedsheet crash protection system 10 will push the occupant 20 into a desired posture which can better use human anatomy to resist and absorb the impact energy with the highly elastic bed sheet. The high elasticity of the bedsheets such as the first bedsheet portion 38 and the second bedsheet portion 46 minimize potential occupant injury.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sleeping occupant crash protection system, comprising:
   an occupant sleeping compartment positioned within an autonomous vehicle;
   a substantially flat platform of the occupant sleeping compartment supporting an occupant reclining in a horizontal sleep position;
   an elastic bedsheet positioned in direct contact with an upper surface of the platform positioned between the occupant and the platform, wherein the elastic bedsheet includes a first bedsheet portion and a second bedsheet portion; and
   a sensing system in communication with the occupant sleeping compartment and triggering deployment of a bedsheet displacement system during a vehicle rapid deceleration event, wherein the first bedsheet portion is rotated about a first arc of rotation toward a vehicle rearward facing direction when the vehicle rapid deceleration event defines a vehicle rear impact the second bedsheet portion is rotated about a second arc of rotation toward a vehicle forward facing direction opposite to the vehicle rearward facing direction when the vehicle rapid deceleration event defines a vehicle front impact.

2. The system of claim 1, wherein the bedsheet displacement system includes a first initiation system in communication with the sensing system, the first initiation system including:
   a first arm laying on the upper surface of the platform in a first arm non-displaced position; and
   a second arm laying on the upper surface of the platform in a second arm non-displaced position; and
   wherein the first bedsheet portion is connected to free ends of the first arm and to the second arm.

3. The system of claim 2, wherein the first initiation system includes a rapid displacement first motor wherein the first arm and the second arm are displaced by operation of the first initiation system.

4. The system of claim 3, wherein when the vehicle rapid deceleration event defines the front vehicle impact an acceleration of the occupant in the vehicle forward facing direction is induced, and a signal from the sensing system directs the rotation of the first bedsheet portion of the elastic bedsheet approximately 90 degrees upward about the first arc of rotation away from a contact position with the upper surface of the platform.

5. The system of claim 4, wherein femurs/legs of the occupant including occupant hips are rotated together with the first bedsheet portion in the vehicle rearward facing direction, contact and elastically deflect the first bedsheet portion and are restrained by the first bedsheet portion.

6. The system of claim 3, wherein the bedsheet displacement system includes a second initiation system in communication with the sensing system, the second initiation system including:
   a third arm laying on the upper surface of the platform in a non-displaced position; and
   a fourth arm laying on the upper surface of the platform in a non-displaced position; and
   wherein the second bedsheet portion is connected to free ends of the third arm and to the fourth arm.

7. The system of claim 6, further comprising a second actuation device:
   wherein the third arm and the fourth arm are in communication with the second initiation system;
   wherein when the vehicle rapid deceleration event defines the rear vehicle impact an acceleration of the occupant in the vehicle rearward facing direction is induced, and a signal from the sensing system directs the rotation of the second bedsheet portion of the elastic bedsheet approximately 90 degrees upward about the second arc of rotation away from a contact position with the upper surface of the platform and toward the forward facing direction; and
   wherein a head and a torso of the occupant including occupant hips rotate in the vehicle forward facing direction, contact and elastically deflect the second bedsheet portion and are restrained by the second bedsheet portion.

8. The system of claim 1, further comprising opposed vertically oriented side walls of the occupant sleeping compartment including a first wall and a second wall opposed to and oriented parallel to the first wall.

9. The system of claim 8, further comprising a first airbag mounted to the first wall and a second airbag mounted to the second wall, the first airbag and the second airbag actuated by a signal from the sensing system during the vehicle rapid deceleration event.

10. A sleeping occupant crash protection system, comprising:
    an occupant sleeping compartment positioned within an autonomous vehicle;
    a substantially flat platform of the occupant sleeping compartment supporting an occupant initially reclining in a horizontal sleep position;
    an elastic bedsheet positioned in direct contact with an upper surface of the platform and positioned between the occupant and the platform, the elastic bedsheet having a first bedsheet portion rotated in a vehicle rearward facing direction during a first vehicle rapid deceleration event, and a second bedsheet portion oppositely rotated in a vehicle forward facing direction during a second vehicle rapid deceleration event; and
    a sensing system in communication with the occupant sleeping compartment and triggering rotation of at least one of the first bedsheet portion during the first vehicle rapid deceleration event and the second bedsheet portion during the second vehicle rapid deceleration event.

11. The sleeping occupant crash protection system of claim 10, further comprising:
    at least one frangible seam normally connecting the first bedsheet portion to the second bedsheet portion; and
    at least one overlapped portion defining a folded portion of the bedsheet connected to the first bedsheet portion and the second bedsheet portion by the at least one frangible seam.

12. The sleeping occupant crash protection system of claim 11, wherein when one of the first vehicle rapid deceleration event and the second vehicle rapid deceleration event includes less than a first predetermined impact force acting on the bedsheet by the occupant, the frangible seam is retained.

13. The sleeping occupant crash protection system of claim 12, wherein when one of the first vehicle rapid deceleration event and the second vehicle rapid deceleration event includes an occupant acceleration impact force greater than the first predetermined impact force from the occupant acting on the bedsheet, the at least one frangible seam fractures to absorb a portion of the occupant acceleration impact force and the bedsheet lengthens by a length of the folded portion providing additional energy absorption by the bedsheet.

14. The sleeping occupant crash protection system of claim 10, further comprising:

a first initiation system including a rapid displacement first motor wherein the first bedsheet portion is rotated by operation of the first initiation system; and a second initiation system including a rapid displacement second motor wherein the second bedsheet portion is rotated by operation of the second initiation system.

15. The sleeping occupant crash protection system of claim 10, further comprising a pulley device positioned above the platform and connected by at least one first cable to the first bedsheet portion and by at least one second cable to the second bedsheet portion;

wherein the pulley device in a first direction acts to rotate the first bedsheet portion in the vehicle rearward facing direction; and wherein the pulley device in a second direction acts to rotate the second bedsheet portion in the vehicle forward facing direction.

16. The sleeping occupant crash protection system of claim 10, wherein:

when an oblique impact force occurring at an oblique angle with respect to a vehicle longitudinal axis of the autonomous vehicle is within a pre-set angle range $-\theta_1 \sim +\theta_1$, determined by acceleration magnitudes issued from the sensing system, only the first bedsheet portion and the second bedsheet portion are deployed;

when the oblique impact force occurring at the oblique angle is more than $\theta_1$ but less than a second pre-set angle ($\theta_2$), both the first bedsheet portion and the second bedsheet portion are deployed and at least one side airbag connected to the occupant sleeping compartment is deployed; and when the oblique impact force occurring at the oblique angle is within $+\theta_2 \sim (180°-\theta_2)$, only the at least one side airbag is deployed.

17. A method for protecting sleeping passengers of an autonomous vehicle, comprising:

positioning a sleeping compartment within an autonomous vehicle;

supporting an occupant reclining in a horizontal sleep position on a substantially flat platform of the sleeping compartment;

positioning an elastic bedsheet in direct contact with an upper surface of the platform and positioned between the occupant and the platform, wherein the elastic bedsheet includes a first bedsheet portion and a second bedsheet portion; and placing a sensing system in communication with the sleeping compartment and triggering deployment of a bedsheet initiation system during a vehicle rapid deceleration event, wherein triggering deployment of the bedsheet initiation system includes rotating the first bedsheet portion of the elastic bedsheet about a first arc of rotation toward a vehicle rearward facing direction when the vehicle rapid deceleration event defines a vehicle rear impact and rotating the second bedsheet portion of the elastic bedsheet about a second arc of rotation toward a vehicle forward facing direction opposite to the vehicle rearward facing direction when the vehicle rapid deceleration event defines a vehicle front impact.

18. The method of claim 17, further including:

sending a first signal from the sensing system to direct rotation of the first bedsheet portion approximately 90 degrees upward away from a contact position with the upper surface of the platform to mitigate an acceleration of the occupant in the vehicle forward facing direction when the vehicle rapid deceleration event defines the front vehicle impact; and sending a second signal from the sensing system to direct rotation of the second bedsheet portion approximately 90 degrees upward away from a contact position with the upper surface of the platform to mitigate an acceleration of the occupant in the vehicle rearward facing direction when the vehicle rapid deceleration event defines the rear vehicle impact.

* * * * *